Figure 1:
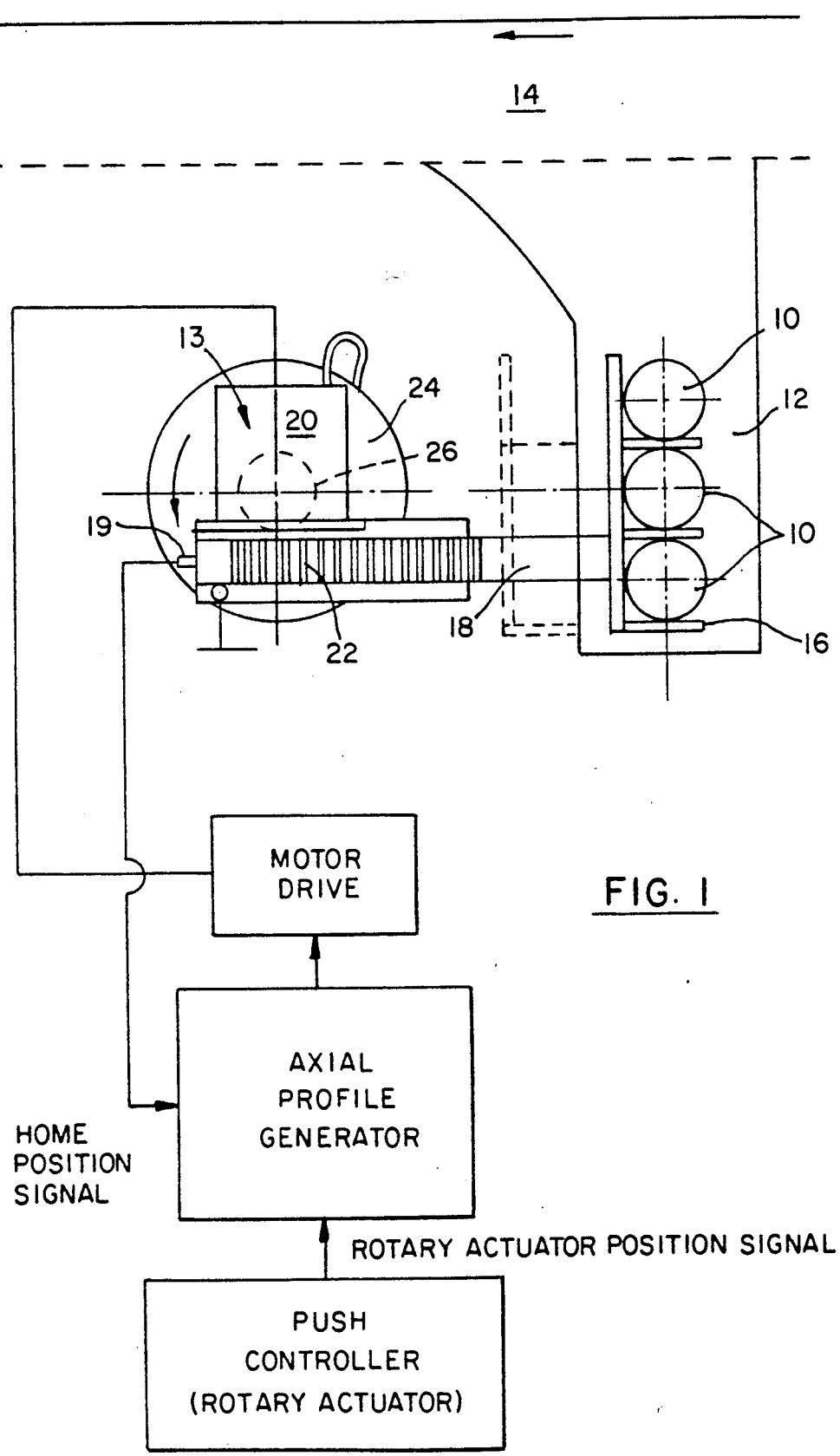

United States Patent [19]

Voisine et al.

[11] Patent Number: 5,037,466
[45] Date of Patent: Aug. 6, 1991

[54] PUSHOUT FOR I.S. MACHINE

[75] Inventors: Gary R. Voisine, South Windsor; Vaughan Abbott, East Hartland; Timothy J. Liska, West Simsbury, all of Conn.

[73] Assignee: Emhart Industries, Inc., Towson, Md.

[21] Appl. No.: 651,303

[22] Filed: Feb. 6, 1991

[51] Int. Cl.$^5$ .................... C03B 35/10; B65G 25/00
[52] U.S. Cl. .................... 65/260; 198/468.01; 198/470.1
[58] Field of Search .................... 65/260; 198/468.01, 198/470

[56] References Cited

U.S. PATENT DOCUMENTS

| | | | |
|---|---|---|---|
| 3,595,365 | 7/1971 | Faure | 65/260 X |
| 4,771,878 | 9/1988 | Braithwaite et al. | 198/468.01 |
| 4,927,444 | 5/1990 | Voisine | 198/468.01 X |

Primary Examiner—Robert L. Lindsay
Attorney, Agent, or Firm—Spencer T. Smith

[57] ABSTRACT

The ware handler is axially advanceable from a retracted position to an advanced position to receive ware deposited on a dead plate and during its pivotal movement to displace the ware through an arc onto a deadplate the ware handler is further advanceable in accordance with a predetermined feed program to maintain control over the received ware.

2 Claims, 2 Drawing Sheets

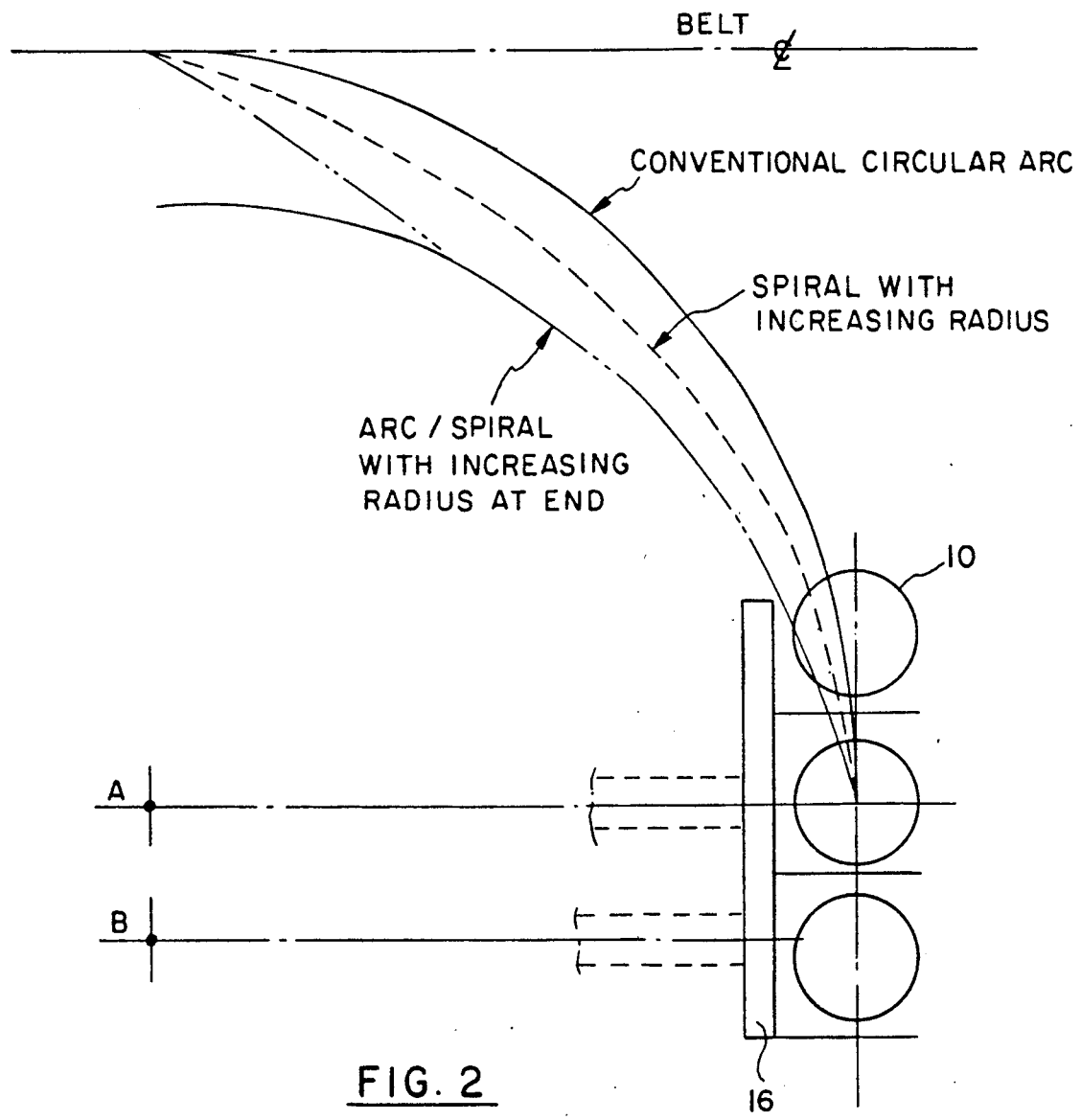

PUSHOUT FOR I.S. MACHINE

The present invention relates to pushouts for I.S. glass container forming machines.

Each section of an I.S. machine deposits finished bottles on a dead plate and a pushout mechanism displaces the bottles from the dead plate through an angle of about from 90° to 120° onto a moving conveyor. Such pushouts have a set program of displacement with the pusher fingers first being axially advanced to the dead plate to receive the formed bottles and following a short period of time during which the bottles settle down the pusher fingers are then rotated to deposit the bottles on the conveyor. The pusher fingers are then axially retracted leaving the bottles on the conveyor and rotated back to the initial position.

As I.S. machines increase in speed pushout cycle time must be reduced. U.S. Pat. No. 4,927,444 discloses one technique of controlling the bottles during pushout operation so that cycle speed can be increased.

It is an object of the present invention to better control bottle displacement so that pushout speed can be increased.

Other objects and advantages of the present invention will become apparent from the following portion of this specification and from the accompanying drawings which illustrates in accordance with the mandate of the patent statutes a presently preferred embodiment incorporating the principles of the invention.

Referring the drawings:

FIG. 1 is a top view of the pusher made in accordance with the teachings of the present invention; and FIG. 2 is a schematic comparison of the pushout path of a conventional pushout and the pushout paths of a pushout made in accordance with the teachings of the present invention.

Formed glass bottles 10 which were deposited on a dead plate 12 of an individual section of an I.S. machine will be pushed by a pusher mechanism 13 from the dead plate 12 onto a moving conveyor 14. The pusher mechanism 13 is made up of pusher fingers 16 secured to a rack element 18, a first programmable stepping motor 20 (which could be a servo motor) a drive gear 22 connected to the motor output shaft and drivingly engaging the rack, a support plate 24 which is pivotably displacable about a vertical axis by a second programmable stepping motor 26 from a start angle (0°) to a predetermined finish angle (from 90° to 120°).

At the beginning of a cycle, the rack element 18 is fully retracted and this position is verified by a Home Position Signal issued by a start position sensor 19. The Pushout Controller than instructs the Axial Profile Generator to define a first rack advance displacement profile to drive the Motor Drive to advance the motor and hence the rack and the pusher fingers a predetermined stroke (A).

The conventional circular arc of the pusher fingers is illustrated in FIG. 2 pivoting about point A. As the rotational speed of the pusher increases, the bottles tend to move outwardly radially and control of the bottles by the pusher fingers is lessened. According to the present invention, a second rack advance displacement profile will be defined by the Axial Profile Generator which will maintain the desired control over the bottles. In FIG. 2 the new pushout is pivotable about point B. This second rack advance displacement profile may either track the illustrated doted line which is a spiral having an ever increasing radius (which is defined to track the natural movement of the bottles) or the dot-dash line which is follows the conventional circular path for a portion of the displacement and then spiral out to the desired end position. The pusher fingers will accordingly track bottle movement instead of forcing the bottles to track pusher fingers movement by keeping the rotational speed of the pusher fingers down. If desired, the stepping motors can be controlled in a closed loop by providing feedback from encoders.

We claim:

1. A pusher mechanism for horizontally displacing at least one bottle from an at rest position on a dead plate of an I.S. machine through a predetermined angle onto a moving conveyor comprising
    pusher fingers having at least one ware receiving receptacle,
    means for horizontally axially displacing said ware pusher fingers
    means for supporting said pusher fingers and said displacing means for pivotal displacement about a vertical axis between a start orientation and a finish orientation,
    means for operating said axially displacing means to displace said pusher fingers from a retracted position to an advanced position while said supporting means is at said start orientation to receive ware on the dead plate, and
    means for operating said axially displacing means in accordance with a predetermined feed program to displace said pusher fingers from said advanced ware receiving position to a further advanced position as said supporting means is pivotally displaced through at least a portion of the pivotal displacement from said start orientation to said finish orientation.

2. A pusher mechanism according to claim 1, wherein said operating means comprises means for continuously axially advancing said pusher fingers beyond said advanced position as said support means pivots from said start orientation to said finish orientation.